United States Patent
Joshi et al.

(10) Patent No.: US 9,052,795 B2
(45) Date of Patent: Jun. 9, 2015

(54) DISPLAYING SIDE-TABBED PANELS FOR AN APPLICATION OPERATING ON A COMPUTING DEVICE

(75) Inventors: Binal L. Joshi, San Jose, CA (US); Armen Kesablyan, San Jose, CA (US); Anthony C. Mowatt, Emeryville, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 169 days.

(21) Appl. No.: 13/609,973

(22) Filed: Sep. 11, 2012

(65) Prior Publication Data

US 2014/0075369 A1    Mar. 13, 2014

(51) Int. Cl.
*G06F 3/0481* (2013.01)
*G06F 3/0482* (2013.01)
*G06F 3/0483* (2013.01)

(52) U.S. Cl.
CPC .......... *G06F 3/0481* (2013.01); *G06F 3/04817* (2013.01); *G06F 3/0482* (2013.01); *G06F 3/0483* (2013.01)

(58) Field of Classification Search
CPC . G06F 3/0481; G06F 3/04817; G06F 3/0482; G06F 3/0483
USPC .......................................................... 715/777
See application file for complete search history.

(56) References Cited

U.S. PATENT DOCUMENTS

| | | | | |
|---|---|---|---|---|
| 5,870,091 A | * | 2/1999 | Lazarony et al. | 715/804 |
| 6,248,946 B1 | * | 6/2001 | Dwek | 84/609 |
| 2006/0161859 A1 | * | 7/2006 | Holecek et al. | 715/781 |
| 2008/0270931 A1 | * | 10/2008 | Bamford | 715/777 |
| 2012/0060111 A1 | * | 3/2012 | Kim | 715/777 |
| 2012/0117507 A1 | * | 5/2012 | Tseng et al. | 715/774 |
| 2014/0040776 A1 | * | 2/2014 | Dann et al. | 715/753 |

OTHER PUBLICATIONS

Dobie, Alex. "Android 4.1 Jelly Bean Notifications." YouTube. Android Central, Jul. 12, 2012. Web. Aug. 29, 2014. <https://www.youtube.com/watch?v=wobNR/MFrTc>.*

Shelly Duncan and Phil Loughhead, "Album Designer Panels", http://wiki.altium.com/display/ADOH/Working+with+Panels, Sep. 8, 2009, 10 pages.

"Flash Workflow and Workspace", http://help.adobe.com/en_US/flash/cs/using/WSF47835DC-369E-4bde-8C65-FF6B531C8C51a.html, Jul. 24, 2012, 10 pages.

* cited by examiner

*Primary Examiner* — Ajay Bhatia
*Assistant Examiner* — Justin R Blaufeld
(74) *Attorney, Agent, or Firm* — McDermott Will & Emery LLP

(57) ABSTRACT

A method for displaying panels in a user interface of a computing device includes displaying, via the computing device, tabs vertically along sides of the panels on the user interface. The tabs correspond to the panels, and the panels provide control options for an application operating on the computing device. The method further includes displaying, via the computing device, a first one of the panels for a first one of the tabs selected for display on the user interface, and suppressing, via the computing device, display of a portion of the panels on the user interface. The portion of the panels does not include the first one of the panels.

16 Claims, 6 Drawing Sheets

DISPLAYING SIDE-TABBED PANELS FOR AN APPLICATION OPERATING ON A COMPUTING DEVICE

BACKGROUND

Applications provide a variety of user interfaces to convey information to users and provide user-selectable options for controlling the applications. User interfaces present user-selectable options on user interfaces as headers, tabs, panels, slider bars, and screen buttons, for example. These user-selectable options consume a large portion of space on the user interfaces, which clutters the user interfaces. Clutter on the user interface limits the space in which work is able to be performed and limits productivity. To limit the clutter, text presented in the user-selectable options (e.g., headers, tabs, etc.) is truncated, which provides limited information for the features being provided by the user-selectable options.

DETAILED DESCRIPTION

Described herein are techniques for displaying tabs for control panels for an application vertically adjacent with a single control panels displayed, or horizontally adjacent without the control panels displayed to provide a user interface for the application that is relatively uncluttered.

According to one embodiment, a method for displaying panels in a user interface of a computing device includes displaying, via the computing device, tabs vertically along sides of the panels on the user interface. The tabs correspond to the panels, and the panels provide control options for an application operating on the computing device. The method further includes displaying, via the computing device, a first one of the panels for a first one of the tabs selected for display on the user interface, and suppressing, via the computing device, display of a portion of the panels on the user interface. The portion of the panels does not include the first one of the panels.

According to another embodiment, a non-transitory computer-readable storage medium includes instructions for displaying panels in a user interface of a computing device, wherein the instructions, when executed, are for controlling the computing device to be configured for: displaying tabs vertically along sides of the panels on the user interface, wherein the tabs correspond to the panels, and the panels provide control options for an application operating on the computing device; displaying a first one of the panels for a first one of the tabs selected for display on the user interface; and suppressing display of a portion of the panels on the user interface, wherein the portion of the panels does not include the first one of the panels.

According to another embodiment, a computing device for displaying panels in a user interface of the computing device includes a processor, and a computer-readable storage medium includes instructions for controlling the set of processors to be operable for: displaying tabs vertically along sides of the panels on the user interface, wherein the tabs correspond to the panels, and the panels provide control options for an application operating on the computing device; displaying a first one of the panels for a first one of the tabs selected for display on the user interface; and suppressing display of a portion of the panels on the user interface, wherein the portion of the panels does not include the first one of the panels.

Figure 1:
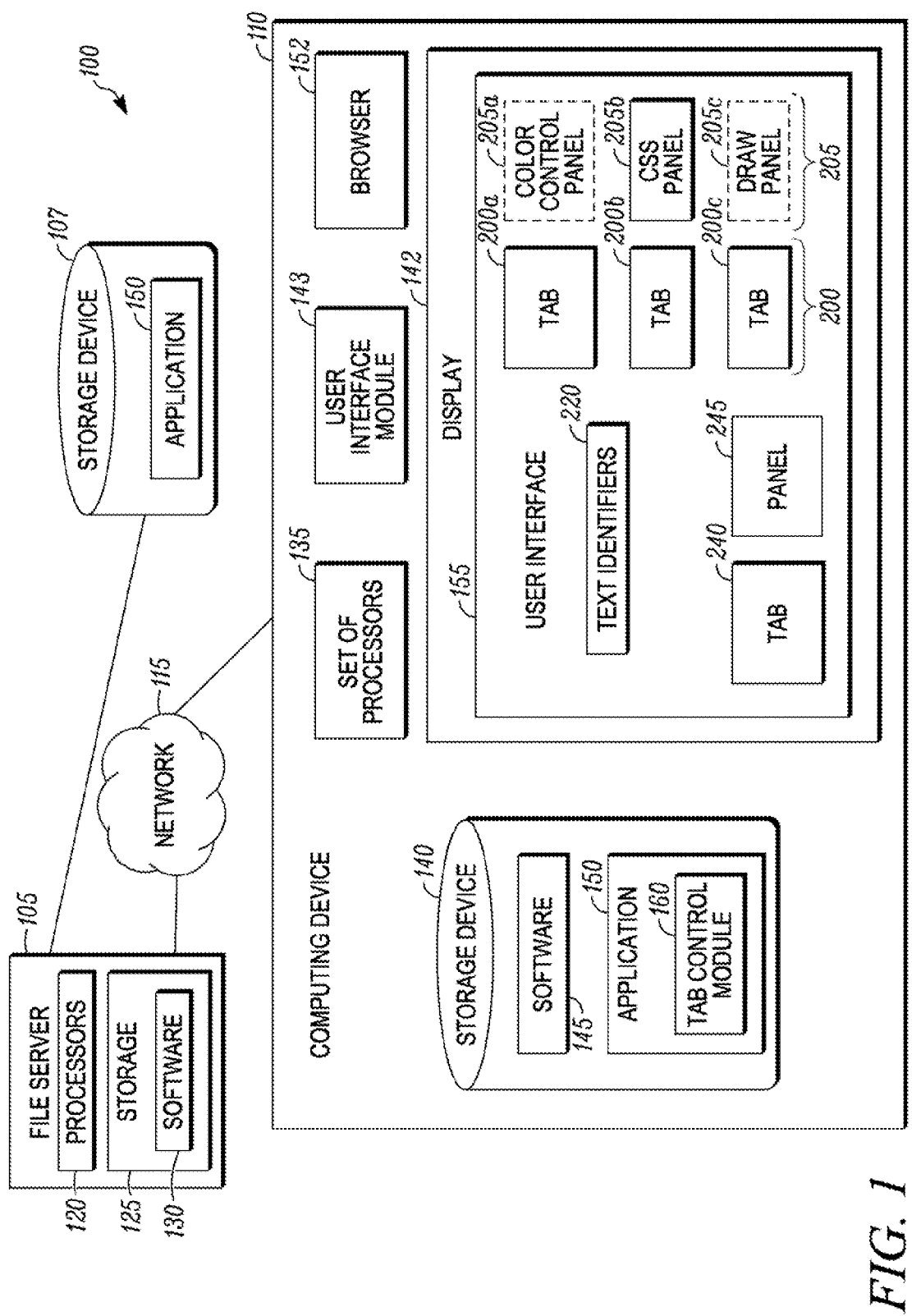
FIG. 1 depicts a computing system according to one embodiment.

FIG. 1 depicts a computing system 100 according to one example embodiment. Computing system 100 includes an application server 105, a storage device 107, a computing device 110, and a network 115. Application server 105 may be a computing device that operates a server operating system. Application server 105 may include a set of processors 120 and a storage device 125. Storage device 125 may store software 130, which may be supplied from storage device 125 to the set of processors 120 for execution. Similarly, computing device 110 may include a set of processors 135, a storage device 140, a display 142, and a user interface module 143. Computing device 110 may include a variety of devices such as a desktop computer, a laptop computer, a tablet computer, a mobile device, such as a personal digital assistant (PDA), smartphone, etc. Storage device 140 may store software 145, which may be supplied from storage device 140 to the set of processors 135 for execution. Storage devices 107, 125, and 140 may be non-transitory computer readable storage mediums. Network 115 may include a variety of networks, such as one or more intranets, the Internet, etc.

According to one embodiment, one, or both of storage devices 107 and 140 store an application 150. Computing device 110 may communicate with application server 105 via network 115 to retrieve application 150. Alternatively, computing device 110 may retrieve application 150 from the computing device's local storage device 140. Application 150 may be a web application that operates in a browser environment of a browser 152, which operates on computing device 110. Alternatively, application 150 may be a stand along application, which operates on computing device 110.

According to one embodiment, application 150 provides a user interface 155 on display 142 when application 150 is operating on computing device 110. More specifically, user interface module 143 may communicate with application 150 to display user interface 155 on display 142. User interface 155 may be displayed in the browsing environment of browser 152 according to one embodiment.

Tabs 200 are associated with respective panels 205. Although multiple panels 205 are shown in user interface 155, not all panels 205 are displayed concurrently. In one embodiment, panels 205 may be grouped together. For example, a user may group panels 205a, 205b, and 205c together. When grouped together, particular embodiments display tabs 200 vertically with one panel 205 displayed. Computing device 110 may define vertically with relation to a position of a user relative (as detected by a proximity sensor, location sensors, imager, and the like) to one or more components of the computing device or, as will be discussed in more detail below, with relation to a force of gravity and an orientation of computing device 110. This may reduce clutter on user interface 155. When a tab 200 is selected (e.g., focus is directed to tab 200), contents of panel 205 is updated. For example, if focus is directed to tab 200b, user interface 155 displays CSS panel 205b. Then, if focus is directed to tab 200c, user interface 155 displays draw panel 205c. In FIG. 1, panels 205 that are displayed are shown with a solid bounding line, and panels 205 that are not are shown with a dashed bounding line.

Particular embodiments may also display icons 210 in tabs 200 to provide an indication of the functions provided by panels 205 without the truncated text in headers. In one example, user interface 155 may display a title for tab 200, such as when focus or a mouse over is detected on tab 200. This reduces clutter, but also allows a user to display the title for a tab 200 if desired.

To further reduce clutter, user interface 155 may collapse tabs 200 and panels 205. For example, when collapsed, user interface 155 displays tabs 200 horizontally without displaying any panels 205 in the group. When a tab 200 is selected, tabs 200 may be displayed vertically along with a respective panel 205 that is associated with the selected tab 200.

Figure 2:
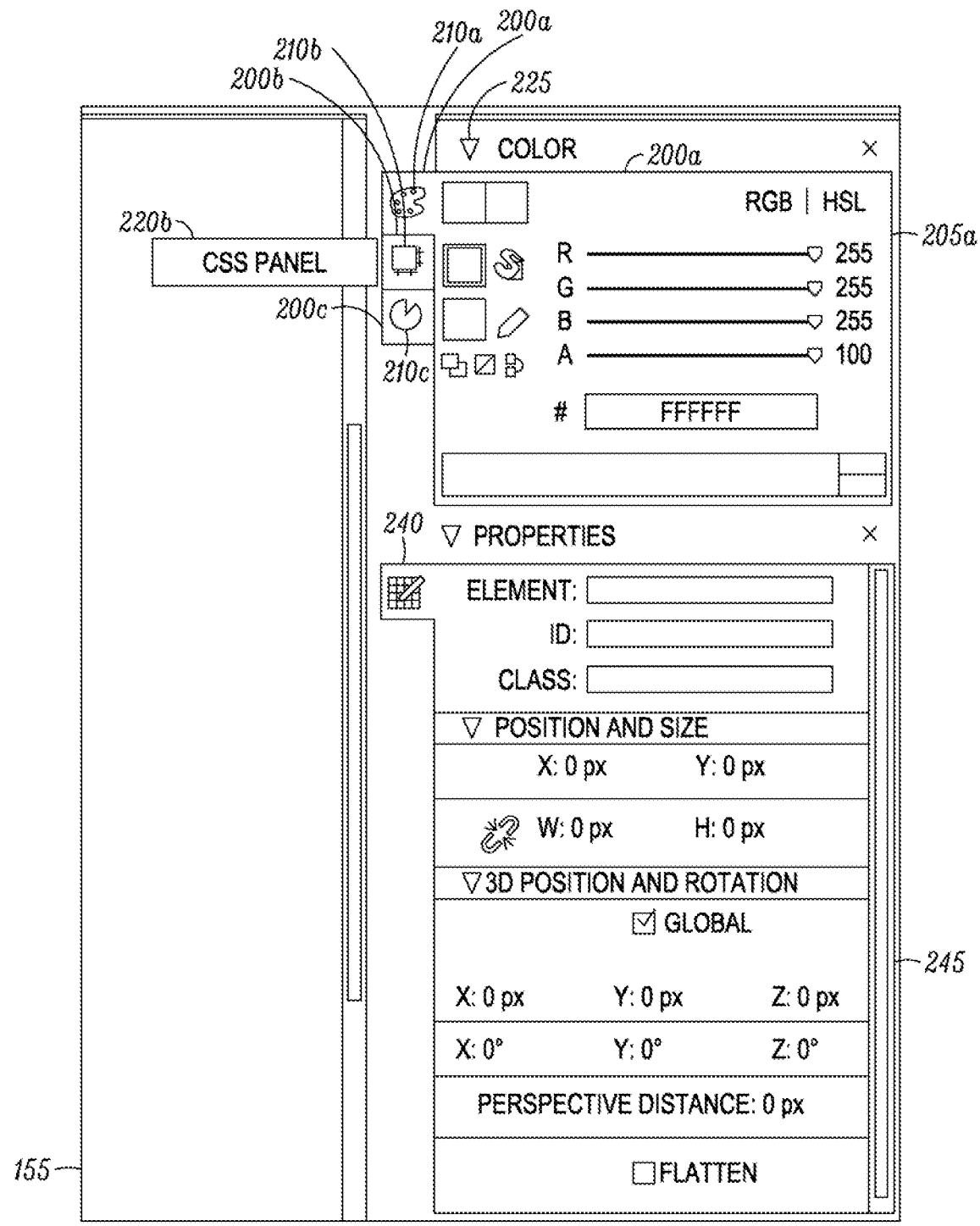
FIG. 2 depicts a user interface displaying vertically disposed tabs for a number of panels according to one embodiment.

FIG. 2 depicts user interface 155 of application 150 according to one example embodiment. FIGS. 1 and 2 are referred to in combination in the following description. User interface module 143 may display tabs 200 in user interface 155.

Each tab 200 is associated with a panel 205. Panels 205 may provide screen options (e.g., buttons, text fields, slider bars, radio dials, etc.) for controlling application 150 and may provide information regarding the status of application 150. For example, for a draw application 150, panels 205 may include: i) a color control panel 205a that provides color control options for an electronic drawing, ii) a CSS (cascading style sheets) panel 205b that provides styles for the electronic drawing, iii) a draw panel 205c that provides options for drawing basic shapes in the electronic drawing, or other panels.

According to one embodiment, user interface module 143 displays tabs 200 vertically adjacent (e.g., directly adjacent) with respect to each other in user interface 155. For example, a user may group certain panels 205 together and these panels are displayed vertically adjacent with respect to each other. User interface 155 shows another tab 240 and corresponding panel 245 that is not in the group. In one embodiment, user interface 155 does not display tab 240 vertically adjacent to tabs 200 and further, panel 245 for tab 240 not in the group of panels 205 is always displayed.

In the group of panels 205, user interface 155 displays a subset of panels 205 for the group of panels. As shown, user interface 155 is displaying a selected panel 205 (e.g., panel 205a) because a selected tab 200 (e.g., tab 200a is selected. A selected panel 205 may be displayed in user interface 155 via the selection of the tab associated with the selected panel. Display of one panel 205 (e.g., panel 205a) causes user interface module 143 to suppress the display of other panels 205 (e.g., panels 205b and 205c). Tabs 200 may be selected by a variety of techniques, such as mouse clicks, a touch (e.g., if display 142 is a touch screen), etc.

According to one embodiment, icons 210 are displayed, respectively, on tabs 200 by user interface module 143. Icons 210 may identify functions respectively provided by panels 205. For example, icon 210a for color control panel 205a may be a paint pallet with various colors displayed on the paint pallet, which identifies the color control function of color control panel 205a. Icon 210b may be a data table for CSS panel 205b where the data table identifies data entry for a CSS file for application 150, and icon 210c may be a drawing object for draw panel 205c where the drawing object identifies drawing functions provided by draw panel 205. The foregoing described icons are for an example embodiment, which is not limiting on the claims.

According to another embodiment, panels 205 are associated with text identifiers 220 that identify panels 205. Text identifiers 220 include text and/or symbols that identify the functions respectively provided by panels 205. FIG. 2 shows one example text identifier, "CSS Panel" 220b, for CSS panel 205b. Text identifiers 220 may be displayed via a variety of techniques, such as positioning a cursor over (sometimes referred to as floating over) tabs 200.

Figure 3:
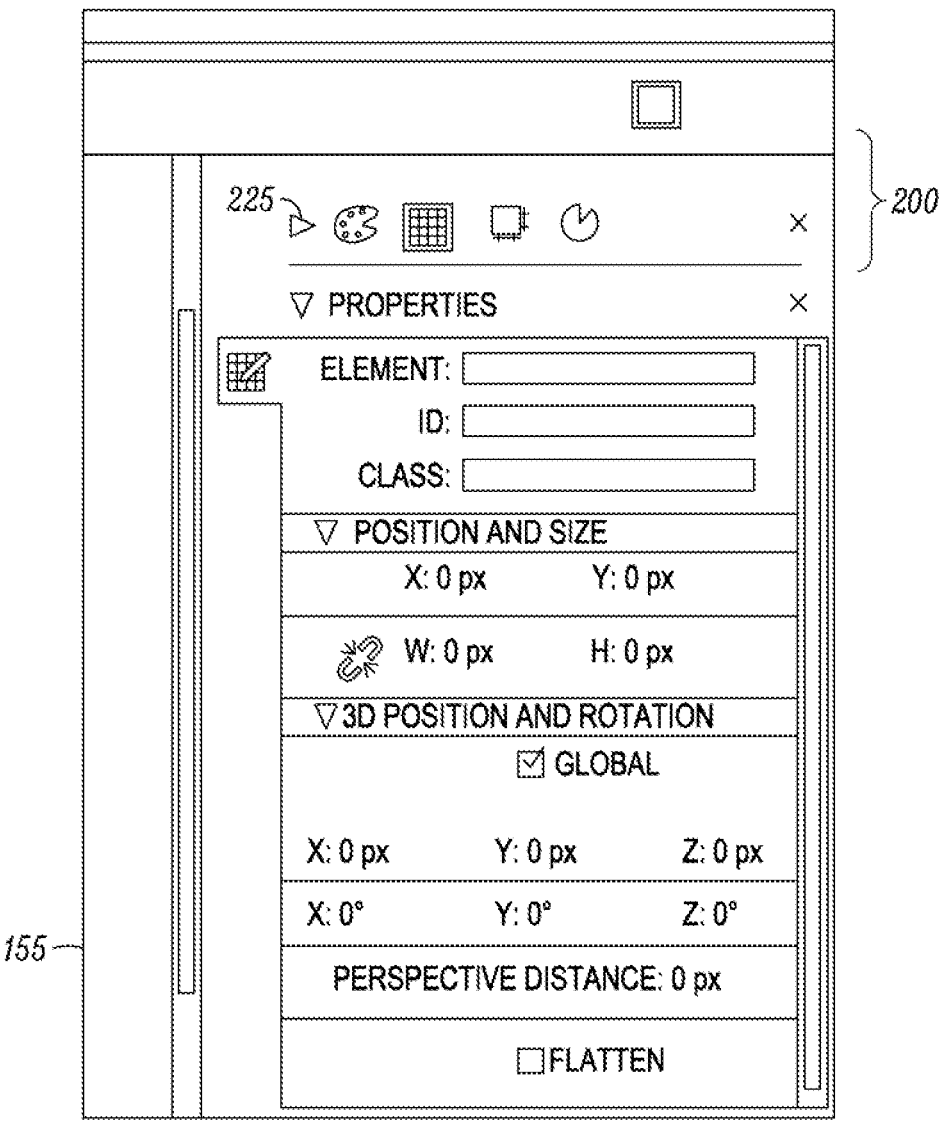
FIG. 3 depicts the tabs displayed horizontally adjacent to each other where the display of the panels is suppressed by the computing device.

According to one embodiment, user interface module 143 displays a collapse icon 225 (or collapse button) on user interface 155. If collapse icon 225 is selected, user interface module 143 may suppress the display of panels 205. Further, if collapse icon 225 is selected, user interface module 143 displays tabs 200 horizontally adjacent (e.g., directly adjacent) to each other in user interface 155. FIG. 3 depicts tabs 200 displayed horizontally adjacent to each to each other, for example, from selection of collapse icon 225. Note that in FIG. 3, with tabs 200 displayed horizontally, user interface module 143 suppresses the display of panels 205 to further reduce screen clutter according to one embodiment. However, user interface module 143 has not suppressed tab 240 and panel 245 because tab 240 and panel 245 are not in the group. Collapse icon 225 may provide a toggle control where one activation of collapse icon 225 causes user interface module 143 to display tabs 200 vertically if tabs 200 are displayed horizontally, or causes user interface module 143 to display tabs 200 horizontally if tabs 200 are displayed vertically.

Referring again to FIGS. 1 and 2, application 150 includes a tab control module 230, which may add tab 240 to the group that includes tabs 200. Computing device 110, and particularly to user interface 155, may accept a variety of inputs for adding tab 240 to tabs 200 and panel 245 to panels 205. For example, panel 245 may be dragged into one of panels 205 to add tab 240 to the group. The specific panel 205 into which panel 245 is dragged may be highlighted (or otherwise changed) by user interface module 143 to indicate the addition of tab 240 to the group. After tab 240 is added to the group, additional tab 240 may be display vertically adjacent with tabs 200. Also, user interface 155 no longer displays additional tab 240 and corresponding panel 245 outside of the group. Thus, to display panel 245, tab 240 needs to be selected (e.g., via a user selection), and then user interface 155 displays panel 245. Further, user interface module 143 may suppress the display of panels 205.

According to a further embodiment, a selected tab 200 (e.g., tab 200a) may be separated from tabs 200, by dragging a selected panel 205 (e.g., panel 205a) away from tabs 200. Tab control module 230 may control the separation of tabs 200. In this case, the separated tab and corresponding panel are not part of the grouping and user interface 155 may display both the separated tab and corresponding panel together irrespective of which tab 200 is selected in the group.

Displaying tabs 200 vertically with one panel 205 displayed leaves user interface 155 relatively uncluttered, and displaying icons 210 in tabs 200 provides an indication of the functions provided by panels 205 without the truncated text in headers that results from relatively more cluttered user interfaces. Further, displaying tabs 200 horizontally on user interface 155 without panels 205 displayed further reduces clutter on user interface 155. Further still, providing a user selectable option, via tab control module 230, for adding tabs (e.g., tab 240) to tabs 200 provides additional user control for reducing clutter on user interface 155.

Figure 4:
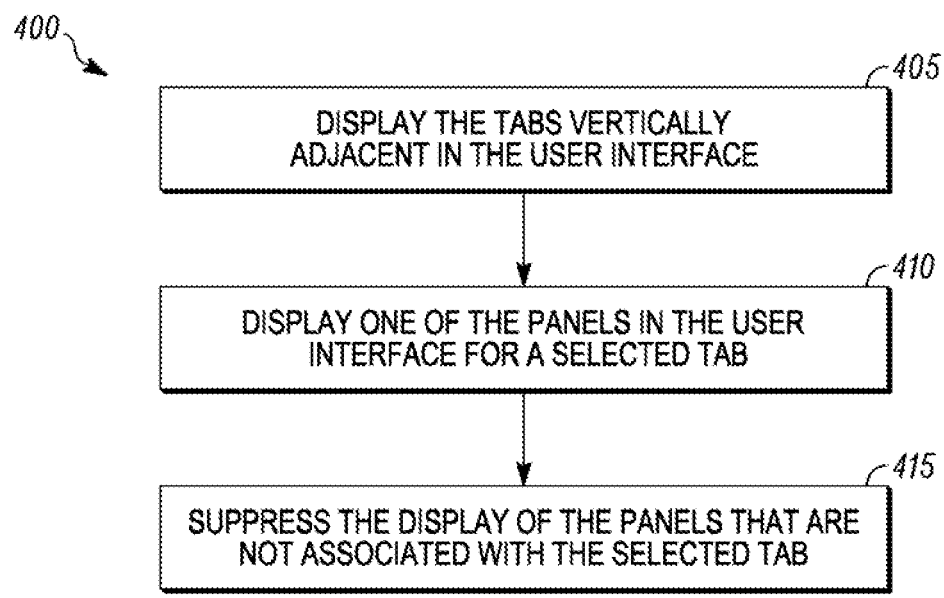
FIG. 4 depicts a high-level flow diagram of a method for displaying tabs in a user interface provided by an application operating on a computing device according to one embodiment.

FIG. 4 depicts a high-level flow diagram of a method 400 for displaying panels 205 in user interface 155 of computing device 110. The high-level flow diagram represents an example embodiment and those of skill in the art will understand that various steps of high-level flow diagram 400 may be combined and/or added without deviating from the scope and the purview of the embodiment.

At 405, tabs 200 are displayed, via computing device 110, vertically along sides of panels 205 on user interface 155. Tabs 200 correspond to panels 205, and panels 205 provide control options for application 150 operating on computing device 110.

At 410, a first one of panels 205 is displayed on user interface 155, via computing device 110, for a first one of the tabs 200, which has been selected (e.g., via a user selection).

At 415, a portion of panels 205 is suppressed from display on user interface 155 by computing device 110 where the portion of panels 205 does not include the first one of the panels displayed at 410.

Figure 5A:
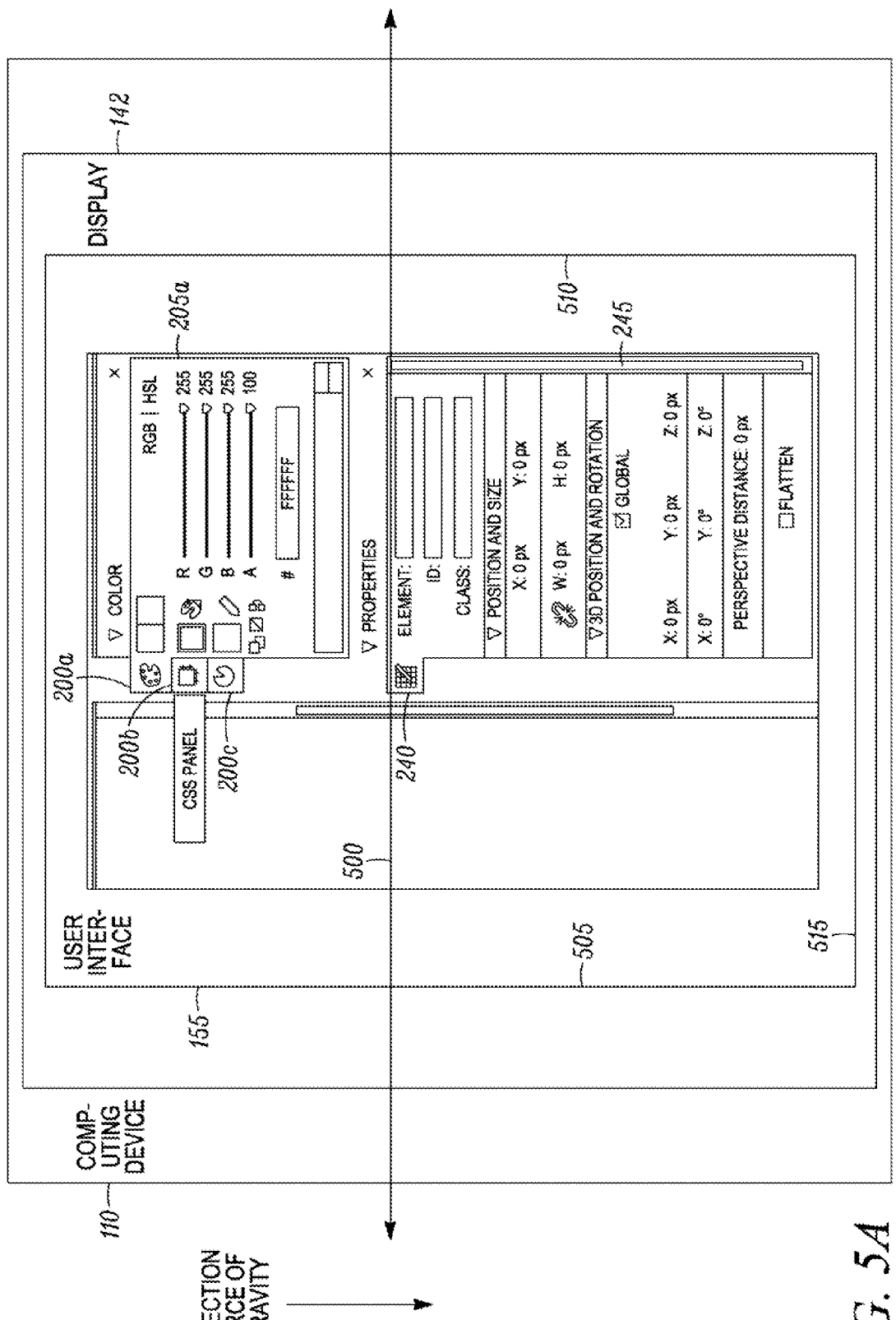
FIGS. 5A and 5B depict the computing device and the display rotated by 90 degrees with respect to the direction of the force of gravity according to one embodiment.
Figure 5B:
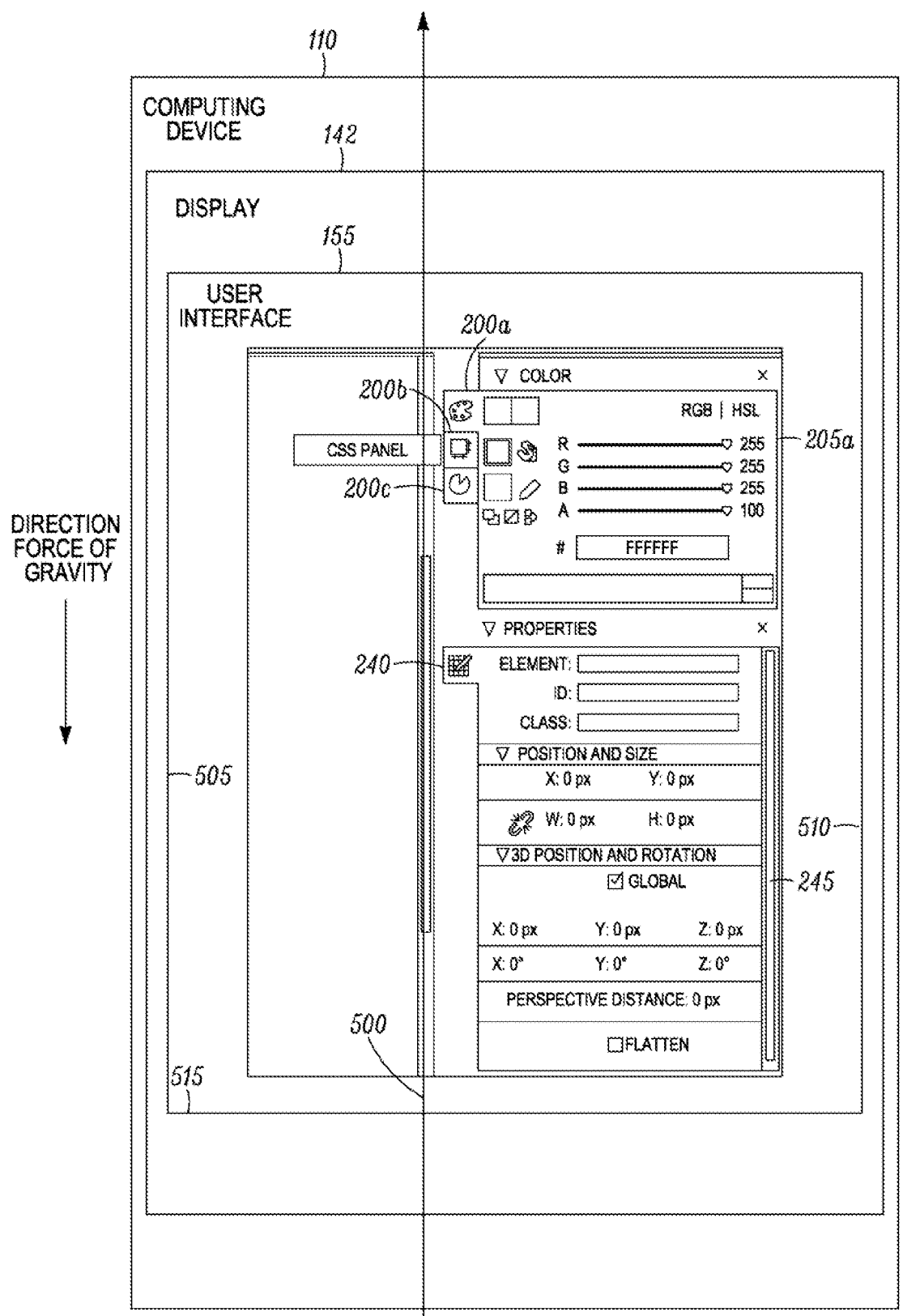

Referring to FIGS. 5A and 5B, these figures depict computing device 110 (e.g., a mobile device, such as a tablet computer) and display 142 rotated by 90 degrees with respect to the direction of the force of gravity according to one embodiment. A longitudinal axis 500 of computing device 110 and display 142 is shown in FIGS. 5A and 5B to clearly indicate the rotated orientations of display 142. In both orientations of computing device 110 and display 142 shown in FIGS. 5A and 5B, sides 505 and 510 of user interface 142 remain aligned with the direction of the force of gravity. Further, when tabs 200 are oriented vertically with respect to a displayed panel (e.g., panel 205a), and with respect to sides 505 and 510, tabs 200 are aligned (e.g., parallel) with the direction of the force of gravity in both orientations of display 143. When tabs 200 are oriented horizontally (e.g., the display of panels 205 is suppressed) with respect to sides 505 and 510, tabs 200 are also oriented horizontally (e.g., perpendicular) to the direction of the force of gravity in both orientations of computing device 110.

According to one embodiment, computing device 110 detects its own rotation with respect to the direction of the force of gravity. For example, computing device 110 uses accelerometers to determine the rotation. When a user rotates computing device 110, computing device 110 rotates user interface 155 (e.g., by 90 degrees) with respect to display 142 so that sides 505 and 510 of user interface 142 remain substantially aligned with the direction of the force of gravity in both orientations of display 142. That is, computing device 110 rotates user interface 155 on display 142 so that sides 505 and 510 remain substantially aligned with the direction of the force of gravity regardless of the orientation of display 142 as shown in FIGS. 5A and 5B. Stated alternatively, a bottom 515 of user interface 142 is oriented downward towards the direction of the force of gravity when display 142 is rotated as described. The substantially constant alignment of sides 505 and 510 by computing device 110 with the direction of the force of gravity defines a reference frame for vertical and horizontal of user interface 155 and for the vertical and the horizontal orientation of tabs 200 as described above. According to one embodiment, the orientation of user interface 155 may be locked to the orientation of display 142 so that user interface 155 rotates with display 142 if display 142 is rotated with respect to the direction of the force of gravity. If the orientation of user interface 155 is locked to display 142, user interface 155 and items displayed on user interface 155 will remain locked in position relative to display 152 regardless of the orientation of display 142 as will be understood by those of skill in the art.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments, along with examples of how aspects thereof may be implemented. The above examples and embodiments should not be deemed to be the only embodiments, and are presented to illustrate the flexibility and advantages of the teachings hereof. Based on the above disclosure and the following claims, other arrangements, embodiments, implementations, and equivalents may be employed without departing from the scope hereof, as defined by the claims.

We claim:

1. A method for displaying panels in a user interface of a computing device, the method comprising:
    displaying, via the computing device, tabs vertically along sides of the panels on the user interface, wherein the tabs correspond to the panels, and the panels provide control options for an application operating on the computing device;
    displaying, via the computing device, a first one of the panels for a first one of the tabs selected for display on the user interface;
    suppressing, via the computing device, display of a portion of the panels on the user interface, wherein the portion of the panels does not include the first one of the panels;
    displaying, via the computing device, a collapse button on the user interface;
    receiving, via the computing device, a first selection of the collapse button, and in response to the first selection of the collapse button:
        suppressing, via the computing device, display of the panels, and
        redisplaying, via the computing device, the tabs that were displayed vertically along the sides of the panels, horizontally on the user interface; and
        in response to a second selection of a second one of the tabs displayed horizontally on the user interface, displaying, via the computing device, the tabs vertically on the user interface along with a second one of the panels corresponding to the selected second one of the tabs.

2. The method of claim 1, displaying, via the computing device, icons in the tabs on the user interface, wherein the icons respectively identify functions of the panels.

3. The method of claim 1, further comprising:
    receiving a third selection of a third one of the tabs; and
    displaying, via the computing device, a name of a third one of the panels corresponding to the third one of the tabs on the user interface based on the third selection.

4. The method of claim 3, wherein selecting the third one of the tabs includes positioning a cursor over the third one of the tabs.

5. The method of claim 1, further comprising:
    displaying, via the computing device, an additional panel on the user interface;
    receiving, via the computing device, a command for dragging the additional panel over the first one of the panels on the user interface; and
    displaying, via the computing device, an additional tab for the additional panel vertically with the tabs on the user interface.

6. The method of claim 5, further comprising:
    displaying the additional panel in the user interface; and suppressing display of the panels on the user interface.

7. The method of claim 1, further comprising:
receiving, via the computing device, a third selection of a third one of the tabs, which corresponds to a third one of the panels;
displaying, via the computing device, the third one of the panels on the user interface based on the third selection of the third one of the tabs; and
suppressing, via the computing device, display of another portion of the panels on the user interface, wherein the another portion of the panels does not include the third one of the panels based on the third selection of the third one of the tabs.

8. A non-transitory computer-readable storage medium comprising instructions for displaying panels in a user interface of a computing device, wherein the instructions, when executed, are for controlling the computing device to be configured for:
displaying tabs vertically along sides of the panels on the user interface, wherein the tabs correspond to the panels, and the panels provide control options for an application operating on the computing device;
displaying a first one of the panels for a first one of the tabs selected for display on the user interface;
suppressing display of a portion of the panels on the user interface, wherein the portion of the panels does not include the first one of the panels;
displaying a collapse button on the user interface;
receiving a first selection of the collapse button, and in response to the first selection of the collapse button:
suppressing display of the panels; and,
redisplaying the tabs that were displayed vertically along the sides of the panels, horizontally on the user interface, while continuing to display the collapse button;
receiving a second selection of a second one of the tabs while the tabs are displayed horizontally on the user interface; and
in response to the second selection of the second one of the tabs, displaying the tabs that were displayed horizontally on the user interface, vertically along the sides of the panels on the user interface along with a second one of the panels corresponding to the selected second one of the tabs.

9. The non-transitory computer-readable storage medium of claim 8, wherein the instructions are for further controlling the computing device to be configured for displaying icons in the tabs on the user interface, wherein the icons respectively identify functions of the panels.

10. The non-transitory computer-readable storage medium of claim 8, wherein the instructions are for further controlling the computing device to be configured for:
receiving a third selection of a third one of the tabs; and
displaying a name of a third one of the panels corresponding to the third one of the tabs on the user interface based on the third selection.

11. The non-transitory computer-readable storage medium of claim 10, wherein selecting the third one of the tabs includes positioning a cursor over the third one of the tabs.

12. The non-transitory computer-readable storage medium of claim 8, wherein the instructions are for further controlling the computing device to be configured for:
displaying an additional panel on the user interface;
receiving a command for dragging the additional panel over the first one of the panels; and
displaying an additional tab for the additional panel vertically with the tabs on the user interface.

13. The non-transitory computer-readable storage medium of claim 12, wherein the instructions are for further controlling the computing device to be configured for:
displaying the additional panel in the user interface; and
suppressing display of the panels on the user interface.

14. The non-transitory computer-readable storage medium of claim 8, wherein the instructions are for further controlling the computing device to be configured for:
receiving a third selection of a second one of the tabs, which corresponds to a second one of the panels;
displaying the second one of the panels on the user interface based on the third selection of the second one of the tabs; and
suppressing display of a second portion of the panels on the user interface, wherein the second portion of the panels does not include the second one of the panels based on the third selection of the second one of the tabs.

15. A computing device for displaying panels in a user interface of the computing device comprising:
a processor; and
a computer-readable storage medium comprising instructions for controlling the processor to be configured for:
displaying first tabs vertically along first sides of first panels on the user interface, wherein the first tabs correspond to the first panels, and the first panels provide control options for an application operating on the computing device;
displaying second tabs vertically along second sides of second panels on the user interface, wherein the second tabs correspond to the second panels;
displaying a first one of the first panels for a first one of the first tabs selected for display on the user interface;
suppressing display of a portion of the first panels on the user interface, wherein the portion of the first panels does not include the first one of the first panels;
displaying a first collapse button on the user interface that corresponds to the first tabs and the first panels, and a second collapse button on the user interface that corresponds to the second tabs and the second panels;
receiving a first selection of the first collapse button, and in response to the first selection of the first collapse button:
suppressing display of the first panels, and
redisplaying the first tabs that were displayed vertically along the first sides of the first panels, horizontally on the user interface, while continuing to display the second tabs vertically along the second sides of the second panels on the user interface;
receiving a second selection of a second one of the first tabs while the first tabs are displayed horizontally on the user interface; and
in response to the second selection of the second one of the first tabs, displaying the first tabs, that were displayed horizontally on the user interface, vertically along the sides of the first panels on the user interface along with a second one of the first panels corresponding to the selected second one of the first tabs.

16. The computing device of claim 15, wherein the computer-readable storage medium further comprises instructions for controlling the processor to be operable for:
displaying an additional panel on the user interface;
receiving a command for dragging the additional panel over the first one of the first panels on the user interface; and displaying an additional tab for the additional panel vertically with the first tabs on the user interface.

\* \* \* \* \*